United States Patent Office 3,005,343
Patented Oct. 24, 1961

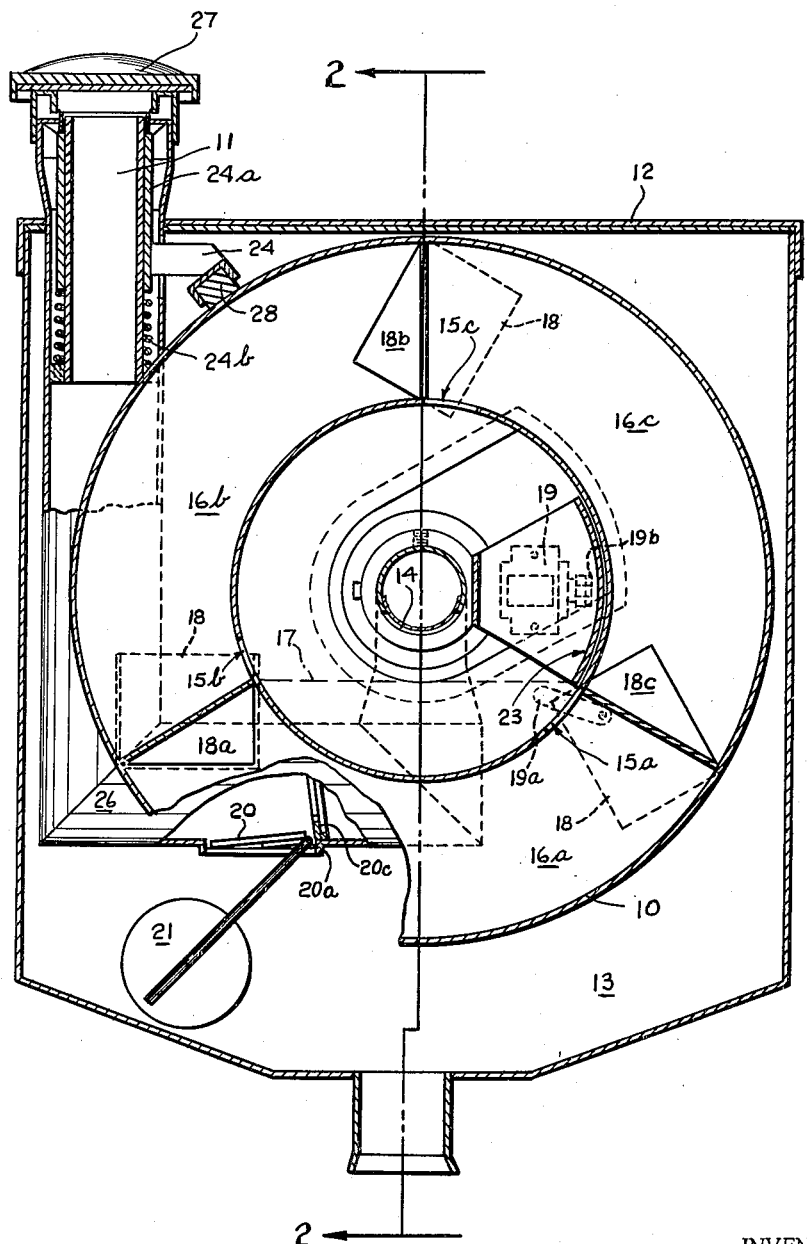

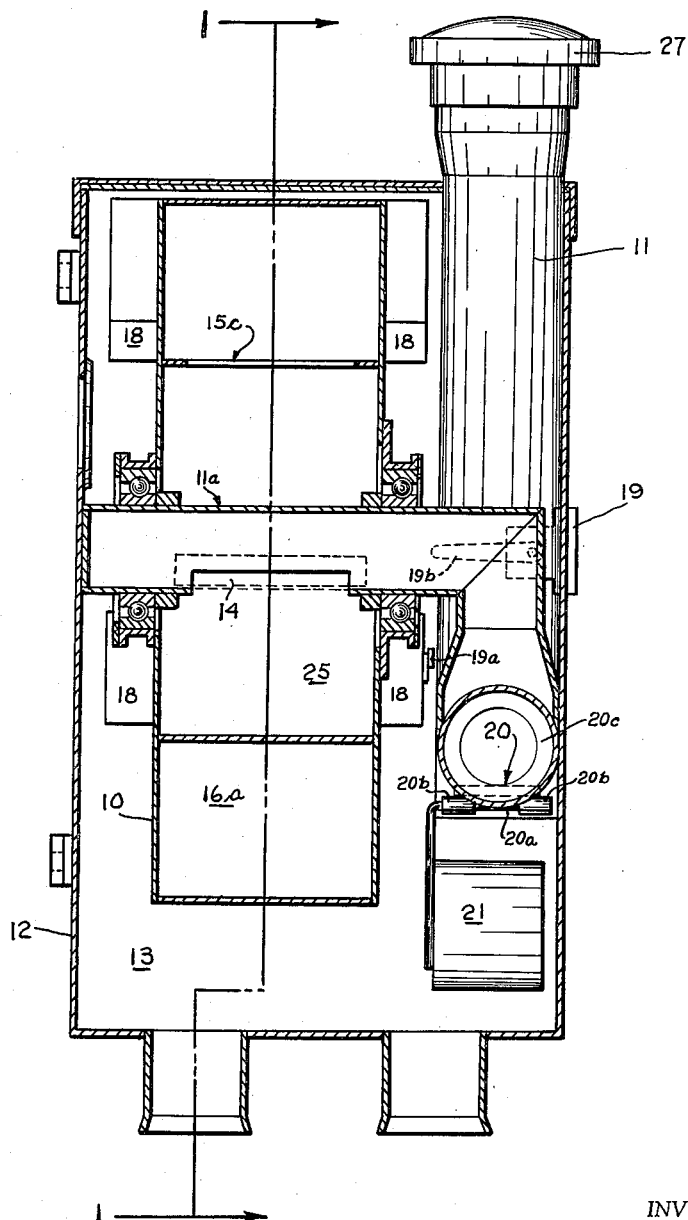

3,005,343
VOLUMETRIC DRUM METER
Robinson W. Brown and William E. Oakey, San Antonio, Tex., assignors of sixty percent to Vernon W. Barge, Jr., Killeen, and forty percent to Ernest W. Porterfield, Waco, Tex.
Filed Aug. 23, 1957, Ser. No. 679,867
3 Claims. (Cl. 73—217)

This invention relates to a new and improved drum meter system for use in measuring the amount of liquid or other material such as free flowing solids passing through the meter.

The principal object of the invention is to provide a new and improved means of measuring the volume of liquid or other material flowing through the device.

Another object is to design this system in such a fashion that when the tank or reservoir is filled, the flow of liquid or other material through the meter is automatically stopped.

A further object is to design this system of a size minimized enough for practical application.

Other objects and advantages of the invention will be apparent from the following description taken in connection with the accompanying drawings. It will be understood that changes may be made in the details of construction and arrangement of parts shown and described, as the preferred form has been given by way of illustration only.

Referring to the drawings:

FIG. 1 is a longitudinal sectional view of the drum meter system; and

FIG. 2 is a sectional view taken on line 2—2 of FIG. 1, looking in the direction of the arrows.

Referring more particularly to the drawings wherein similar reference characters designate corresponding parts throughout, the drum meter system is comprised basically of the drum 10, the inlet pipe 11 and the housing 12.

The drum 10 is mounted on the horizontal portion 11a of the inlet pipe 11 on bearings so that it may revolve.

The drum 10 consists of a central chamber 25, which is provided with three openings 15a, 15b, 15c through which the liquid or other material such as free flowing solids is to flow into the three outer chambers 16a, 16b, 16c to contain and measure the material, and openings 18a, 18b and 18c in the side walls of each outer chamber 16a, 16b, 16c of the drum 10 leading into three sets of discharge cups 18 on opposite sides of drum 10. 17 is a line indicating the level of the material in the central chamber 25 by the time chamber 16a is completely full. The various chambers are of uniform capacity as otherwise the meter would obviously be out of balance and, furthermore, the counting means would not accurately reflect quantities passing through the meter.

The inlet pipe 11, through which the material flows into the central chamber 25 of the drum, consists of a long inlet pipe 11 containing a gooseneck or bend 26. Material flowing through inlet pipe 11 passes through gooseneck 26 and opening 14 to central chamber 25 of the drum 10 from which it passes to the outer chambers 16a, 16b, 16c as hereinafter described. The gooseneck 26 serves to carry the incoming material toward the bottom of the housing 13, so that float 21 may be conveniently attached to valve 20 in the inlet pipe. Valve 20 is a circular disc attached at one point on its periphery to a float rod 20a supported in bearings 20b. The float rod passes through the wall of the gooseneck, and is bent downward and attached to float 21.

The purpose of valve 20 is to prevent the drum 10 from being flooded due to measured material rising in the bottom of the housing 13. If the outlet pipes of the housing become filled with measured material, or material comes out of the drum 10 at a rate faster than the outlet pipes can handle it, the level of the material in the bottom of the housing 13 begins to rise. Float 21 rises with the material, and as it does so, it causes valve 20 to rotate about its pivot point and finally closes the valve against valve seat 20c. This prevents any more material from going into drum 10 until the level of measured material in the bottom of housing 13 drops, thereby dropping float 21 and opening valve 20 attached to it.

Material flowing through inlet pipe 11 passes through goose-neck 26 and opening 14 to central chamber 25 of the drum from which it passes to the outer chambers as herein after described.

The housing 12 is provided with a counter 19 designed to count the number of times the drum revolves, and thereby indicate the quantity of material passing through the meter. Each time the drum 10 makes one revolution, lug 19a, attached to the drum, trips counter arm 19b, recording the measuring capacity of the drum as one unit on the counter.

Within the central chamber 25 is a cutoff valve 23, rigidly attached to horizontal portion 11a of inlet pipe 11, and designed so that said valve is positioned in such a fashion that even though the material level in the central chamber should rise up to any level above that indicated by line 17, the opening 15a is closed by valve 23 as the drum begins to turn, thus permitting no more material from the central chamber to run through said opening.

Shortly after the drum begins to turn, material contained in chamber 16a begins to dump from discharge cups 18, and if the material level is above the line 17 in the central chamber, this material could flow through opening 15a into chamber 16a at the same time material is being dumped from it. Thus the physical volume of chamber 16a would not be a true measure of the material dumped from it, and the meter would be inaccurate. Cutoff valve 23 effectively prevents this from happening by sealing off opening 15a as it rises above the material level at line 17.

A locking device is provided which prevents rotation of drum 10 when not in use. This locking device comprises brake 24 carried by sleeve 24a and which is urged to unlocked position by spring 24b and sleeve 24a is urged against the force of spring 24b by cap or closure 27 to lock brake 24 in operative position.

Pad 28 is a resilient member attached to the end of brake 24 to prevent undue pressure against the drum.

Cap 27 is designed to cover the open end 13 of said inlet pipe and said cap, when placed on the open end of said inlet pipe, operates locking device 24 thus stopping the revolution of the drum 10 during the time the system is not in use.

The meter operates as follows:

The material to be measured is admitted into the open end of the inlet tube 11 and flows through the gooseneck 26 and into the horizontal portion of the inlet tube, from which it flows through opening 14 into the central chamber 25 of the drum 10. This central chamber is provided with three openings 15a, 15b, 15c through which the material may flow into three outer chambers 16a, 16b, 16c. These outer chambers 16a, 16b, 16c are formed by partitioning the space between the inner and outer shells of the drum into three equal divisions. When the drum is in the position shown in FIG. 1, the material flowing from the inlet pipe through the opening 14 into the central chamber of the drum 10 will flow through opening 15a into the lowermost outer chamber of the drum 16a.

When chamber 16a is completely full (up to line 17 in FIG. 1), the material begins to flow through opening 15b into the outer chamber 16b.

As soon as the material begins to fill this chamber 16b, the static equilibrium of the drum 10 is upset and the drum 10 begins to rotate in a counterclockwise direction.

At one end of each outer chamber there are openings 18a, 18b and 18c in the side walls of the drum 10 leading into the oppositely disposed discharge cups 18. The discharge cups 18 are open at the top, and their height is such that the top is above the material level shown by dashed line 17. These cups 18 are partially full when material begins to fill outer chamber 16b. As the drum 10 revolves, outer chamber 16b begins to fill and, at the same time, outer chamber 16a begins to empty through its discharge cups 18 into the bottom 13 of the housing 12 and, thence, through its outlets.

After chamber 16a has emptied, chamber 16b finds its equilibrium position in the same place previously occupied by chamber 16a. This filling and dumping of one chamber after another continues as long as material is supplied to the meter. The volume of material measured by the meter is recorded by a counter 19 attached to the housing. Various counting arrangements can be set up depending upon the units of measure to be used in counting.

When the meter is not in use, the inlet pipe 11 is covered on the open end 13 of said pipe by a cap 27. Said cap, when locked in place, engages locking device 24 in such a manner that pad 28 is forced against drum 10 thus preventing the revolution of said drum as long as the cap is in place.

From the above, it will be seen that we have provided new and improved means for obtaining all of the objects and advantages of the invention.

We claim:

1. In a device of the character described, a housing, a drum rotatably mounted in said housing, an inlet pipe communicating with said drum, said drum having a series of spaced outer chambers each connected by an opening to a central chamber whereby material entering said spaced chambers successively from said central chamber effects rotation of said drum, means for counting the number of rotations of said drum and thereby indicating the amount of material passing through said drum, and valve means for substantially closing the openings from the central chamber to the outer chambers as each outer chamber becomes full.

2. In a device of the character described, a housing, a drum rotatably mounted in said housing, an inlet pipe communicating with said drum, said drum having a series of spaced outer chambers each connected by an opening to a central chamber whereby material entering said spaced chambers successively from said central chamber effects rotation of said drum, means for counting the number of rotations of said drum and thereby indicating the amount of material passing through said drum, and a valve element in said central chamber positioned to interrupt flow through the opening into an outer chamber upon such outer chamber becoming full and continuing to so interrupt flow during a portion of such outer chamber's rotational movement and then ceasing to impede flow so that such outer chamber can be thereafter refilled.

3. In a device of the character described, a housing, a drum rotatably mounted in said housing, an inlet pipe communicating with said drum, said drum having a series of spaced outer chambers each connected by an opening to a central cylindrical chamber whereby material entering said spaced chambers successively from said central chamber effects rotation of said drum, means for counting the number of rotations of said drum and thereby indicating the amount of material passing through said drum, and a valve element having an arcuate surface positioned closely adjacent the path of travel of said openings and also positioned to substantially close each of said openings upon the respective outer chamber's becoming filled.

References Cited in the file of this patent

UNITED STATES PATENTS

| 1,109,804 | Wagley | Sept. 8, 1914 |
| 1,429,232 | Gardiner | Sept. 19, 1922 |
| 1,455,757 | Barnes | May 15, 1923 |
| 1,575,782 | Mowry | Mar. 9, 1926 |
| 2,323,627 | Sherman | July 6, 1943 |

FOREIGN PATENTS

| 777,447 | France | Nov. 26, 1934 |